US012688366B2

(12) United States Patent
Wecker et al.

(10) Patent No.: US 12,688,366 B2
(45) Date of Patent: Jul. 21, 2026

(54) APPARATUS AND METHOD FOR FILLING A KNOWLEDGE GRAPH BY WAY OF STRATEGIC DATA SPLITS

(71) Applicant: Robert Bosch GmbH, Stuttgart (DE)

(72) Inventors: Hanna Wecker, Munich (DE); Annemarie Friedrich, Weil der Stadt (DE); Heike Adel-Vu, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1185 days.

(21) Appl. No.: 17/357,157

(22) Filed: Jun. 24, 2021

(65) Prior Publication Data

US 2021/0406702 A1 Dec. 30, 2021

(30) Foreign Application Priority Data

Jun. 29, 2020 (DE) .......................... 102020208041.0

(51) Int. Cl.
*G06N 5/02* (2023.01)
*G06F 18/20* (2023.01)
(Continued)

(52) U.S. Cl.
CPC ........ *G06F 40/30* (2020.01); *G06F 18/23213* (2023.01); *G06F 18/285* (2023.01); *G06F 40/205* (2020.01); *G06N 5/02* (2013.01)

(58) Field of Classification Search
CPC ......... G06N 5/02; G06F 40/30; G06F 40/205; G06F 18/285; G06F 18/23213
See application file for complete search history.

(56) References Cited

U.S. PATENT DOCUMENTS

| 10,719,301 B1 * | 7/2020 | Dasgupta | ................... G06F 8/34 |
| 11,379,501 B2 * | 7/2022 | Yadav | .................... G06N 3/088 |

(Continued)

FOREIGN PATENT DOCUMENTS

| CN | 106991296 A | 7/2017 |
| CN | 110413856 A | 11/2019 |
| JP | 2019185665 A | 10/2019 |

OTHER PUBLICATIONS

Alessandro Lulli, etc., "Scalable k-NN based text clustering", published via 2015 IEEE International Conference on Big Data, Santa Clara, CA, USA, Oct. 29-Nov. 1, 2015, retrieved Dec. 5, 2024. (Year: 2015).*

(Continued)

*Primary Examiner* — Shourjo Dasgupta
(74) *Attorney, Agent, or Firm* — NORTON ROSE FULBRIGHT US LLP

(57) ABSTRACT

A method for filling a knowledge graph. A first and second subset of data points are determined. A data point to which a label is assigned is associated with a cluster from among a set of clusters, depending on whether a distribution of labels from data points that are already associated with the cluster satisfies a condition. Data points that are associated with the cluster are associated with the first or second subset. Models for classification are trained depending on data points from the first subset. For at least one of the models, a value of a quality factor is determined depending on data points from the second subset. A model for classification is selected from the models depending on the value. A classification that defines a relationship, node, or type of node in the knowledge graph for the sentence is determined using the selected model.

11 Claims, 3 Drawing Sheets

(51) Int. Cl.
  *G06F 18/23213*    (2023.01)
  *G06F 40/205*    (2020.01)
  *G06F 40/30*    (2020.01)

(56)         References Cited

U.S. PATENT DOCUMENTS

| | | | |
|---|---|---|---|
| 2009/0319457 A1 | 12/2009 | Cheng et al. | |
| 2013/0097103 A1 | 4/2013 | Chari et al. | |
| 2017/0293608 A1* | 10/2017 | Seow | G06F 40/242 |
| 2021/0097140 A1* | 4/2021 | Chatterjee | G06N 5/022 |
| 2021/0248193 A1* | 8/2021 | Cho | G06F 17/18 |

OTHER PUBLICATIONS

Liang Yao, etc., "Graph Convolutional Networks for Text Classification", published via arXiv as of Nov. 13, 2018, retrieved Dec. 5, 2024. (Year: 2018).*

Smail Sellah, etc., "A Document Clustering Approach for Automatic Building of Ontologies", published via 2018 Fifth International Conference on Social Networks Analysis, Management and Security, Valencia, Spain, Oct. 15-18, 2018, retrieved Dec. 5, 2024. (Year: 2018).*

Derek Greene, etc., "TextLuas: Tracking and Visualizing Document and Term Clusters in Dynamic Text Data", published via arXiv as of Nov. 3, 2014, retrieved Dec. 5, 2024. (Year: 2014).*

Lirong Qiu, etc., "Chinese-Uyghur-English Semantic Search Based on the Knowledge Graphs", 2017 IEEE International Conference on Computational Science and Engineering (CSE) and IEEE International Conference on Embedded and Ubiquitous Computing (EUC), Jul. 21-24, 2017, retrieved Dec. 5, 2024. (Year: 2017).*

Xiaoli Wang, etc., "An Improved K_means Algorithm for Document Clustering Based on Knowledge Graphs", published via 2018 11th International Congress on Image and Signal Processing, BioMedical Engineering and Informatics, Oct. 13-15, 2018, retrieved Dec. 5, 2024. (Year: 2018).*

John Violos, etc., "Text Classification Using the N-Gram Graph Representation Model Over High Frequency Data Streams", published via Frontiers in Applied Mathematics and Statistics, vol. 4, article 41, Sep. 2018, retrieved Dec. 5, 2024. (Year: 2018).*

Mikolov et al., "Efficient Estimation of Word Representations in Vector Space," ICLR Workshop, 2013, pp. 1-12. <https://arxiv.org/pdf/1301.3781.pdf> Downloaded Jun. 24, 2021.

Arthur et al., "K-Means++: the Advantages of Careful Seeding," Proceedings of the Eighteenth Annual Acm-Siam Symposium on Discrete Algorithms, 2007, pp. 1-11. <http://ilpubs.stanford.edu:8090/778/1/2006-13.pdf> Downloaded Jun. 24, 2021.

Wecker et al., "Clusterdatasplit: Exploring Challenging Clustering-Based Data Splits for Model Performance Evaluation," Proceedings of the First Workshop on Evaluation and Comparison of NLP Systems (EVAL4NLP ), 2020, pp. 155-163.

Vanderplas, "Hyperparameters and Model Validation," Python Data Science Handbook, 2016, pp. 1-19.

* cited by examiner

100 processor(s) —102 memory —104 data points —106 model —108 furnish input data — 202 associate data point(s) with cluster — 204 furnish first and second subsets of data points — 206 train plurality of models — 208 determine a value of a quality factor — 210 select model for classification — 212 furnish set of data points — 214 determine classification — 216

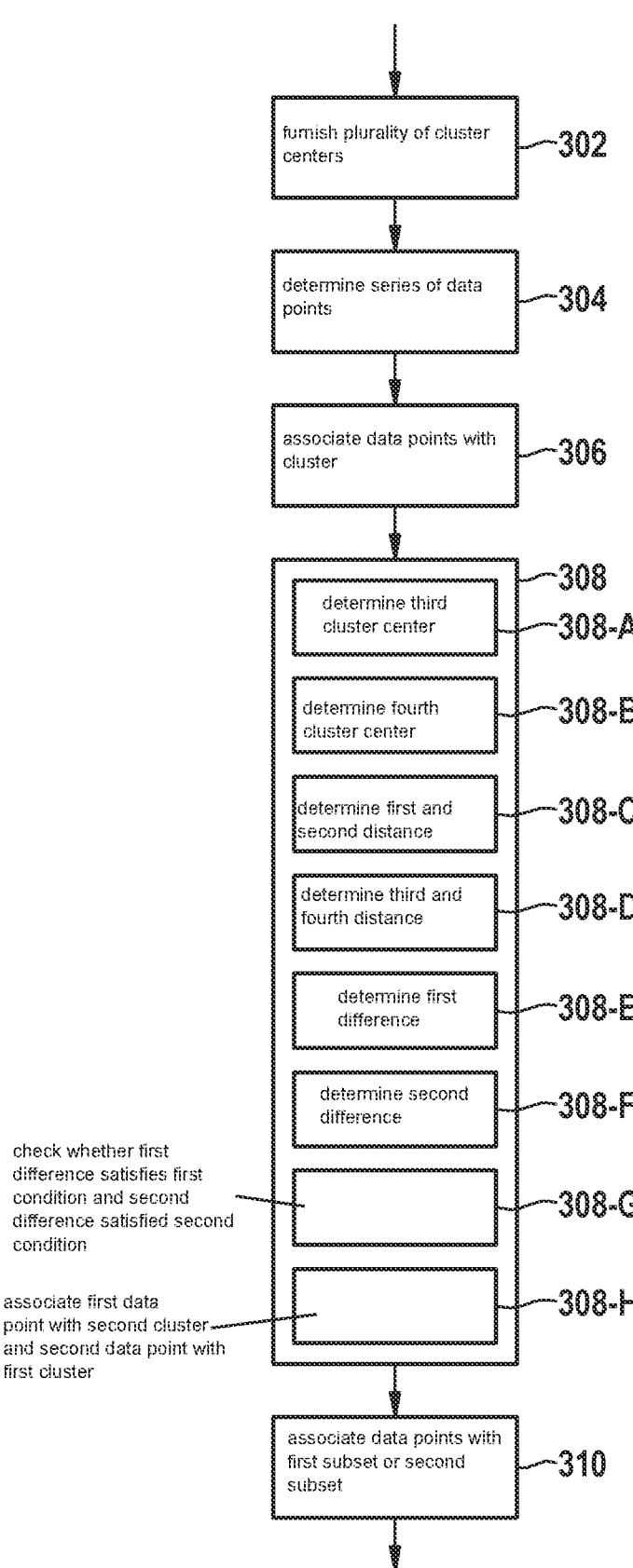

furnish plurality of cluster centers ~302 determine series of data points ~304 associate data points with cluster ~306

308 determine third cluster center ~308-A determine fourth cluster center ~308-B determine first and second distance ~308-C determine third and fourth distance ~308-D determine first difference ~308-E determine second difference ~308-F check whether first difference satisfies first condition and second difference satisfied second condition ~308-G associate first data point with second cluster and second data point with first cluster ~308-H associate data points with first subset or second subset ~310

Fig. 3

APPARATUS AND METHOD FOR FILLING A KNOWLEDGE GRAPH BY WAY OF STRATEGIC DATA SPLITS

CROSS REFERENCE

The present application claims the benefit under 35 U.S.C. § 119 of German Patent Application No. DE 102020208041.0 filed on Jun. 29, 2020, which is expressly incorporated herein by reference in its entirety.

FIELD

The present invention relates to a method and an apparatus for filling a knowledge graph.

SUMMARY

By way of a method and an apparatus in accordance with example embodiments of the present invention, a model for classifying data points, which is more suitable for unknown data points as compared with other models, is trained and is used to fill the knowledge graph.

In accordance with an example embodiment of the present invention, the method for filling the knowledge graph provides that a first subset of a set of data points and a second subset of the set of data points are determined; a data point to which a label is assigned being associated with a cluster from among a set of clusters; the data point being associated with the cluster depending on whether a distribution of labels from data points that are already associated with the cluster satisfies a condition; data points that are associated with the cluster being associated either with the first subset or with the second subset; a plurality of models for classification being trained depending on data points from the first subset; for at least one of the models from among the plurality of models, a value of a quality factor being determined depending on data points from the second subset; a model for classification being selected from the plurality of models depending on the value; a classification that defines a relationship or a node or a type of node in the knowledge graph for the sentence being determined using the model, selected depending on the value, for classification for data. The first subset encompasses training data points. The second subset encompasses development data points. Subdivision according to the distribution of the labels enables improved distribution of the data points depending on their labels, so that a distribution of the data points having the same label into the subsets can be established. The set of data points can thereby be subdivided into different subsets. The number of subsets and the number of clusters can match. The cluster defines one of the subsets.

Preferably a number of data points, which are associated with the cluster and with which the label is associated, is determined, the data point being associated with the cluster if the number satisfies a condition, and otherwise not. The number can define a maximum number of data points of the same label, which number is associated with the cluster. If the number is exceeded, the data point is, for example, associated with another cluster.

In one aspect of the present invention, a series of data points with which the label is associated is determined, the data points being associated with the cluster in accordance with the series as long as the number of data points satisfies the condition. The data points thereby become associated one after another. Data points that are placed farther back in the series are thus associated with the cluster only when the maximum number of data points has not yet been reached as a result of data points placed farther ahead of them in the series.

The series can encompass the data point, the series being determined depending on a difference between a distance of the data point from a first cluster center of a first cluster from among the set of clusters, and a distance of the data point from a second cluster center of a second cluster from among the set of clusters. The difference represents an indication of the sorting of data points in the series.

The data point is preferably placed in the series either before another data point if the difference is greater than a reference, or otherwise after the other data point in the series. The reference is a difference that is determined correspondingly for the other data point. A data point from the series having a greatest difference with respect to other data points of the series thus represents the first data point in the series. This means that the data point having the greatest difference is associated with the cluster first, and the others in decreasing order in terms of their difference.

The first cluster center is preferably that cluster center, from among the set of cluster centers, which is located closest to the data point, the second cluster center being that cluster center, from among the set of cluster centers, which is located farthest from the data point.

In accordance with an example embodiment of the present invention, provision can be made that a third cluster center is determined depending on data points that are associated with the first cluster; a fourth cluster center being determined depending on data points that are associated with the second cluster; a first distance of a first data point of the first cluster from the third cluster center, and a second distance of the first data point from the fourth cluster center, being determined; a third distance of a second data point of the second cluster from the fourth cluster center, and a fourth distance of the second data point from the third cluster, being determined; a first difference between the first distance and the second distance being determined; a second difference between the third distance and the fourth distance being determined; if the labels of the two datapoints are the same, and if the first difference satisfies a first condition and the second difference satisfies a second condition, the first data point being associated with the second cluster, and the second data point with the first cluster. It is thereby possible to perform an exchange of data points if two data points exist which are farther from their respective cluster center than from the respective other cluster center. This improves clustering, or more precisely intra-cluster density, i.e. the fact that the respective clusters have their points as close together as possible, since the data points that are located farthest from their current cluster center are then exchanged with the highest priority.

Provision can be made that a plurality of cluster centers is furnished, data points from among the set of data points being associated with one of the cluster centers from among the plurality of cluster centers. The data points can thereby be associated with a plurality of subsets.

Preferably a number of subsets for the data points is predefined, the number of subsets defining the number of cluster centers. For example, K cluster centers can be predefined, a first subset being constituted from K–1 clusters, and a second subset from the remaining one cluster.

In accordance with an example embodiment of the present invention, a method for generating training data provides that a first subset of a set of data points and a second subset of the set of data points are determined; a data point to which a label is assigned being associated with one cluster from among a set of clusters; the data point being associated with the cluster depending on whether a distribution of labels from data points that are already associated with the cluster meets a condition; data points that are associated with the cluster being associated either with the first subset or with the second subset.

In accordance with an example embodiment of the present invention, the apparatus is embodied to execute the method(s) disclosed herein.

Further advantageous embodiments are evident from the description below and from the figures.

BRIEF DESCRIPTION OF THE DRAWINGS

FIG. 3 shows details of a step of the method, in accordance with an example embodiment of the present invention.

DETAILED DESCRIPTION OF EXAMPLE EMBODIMENTS

Figure 1:
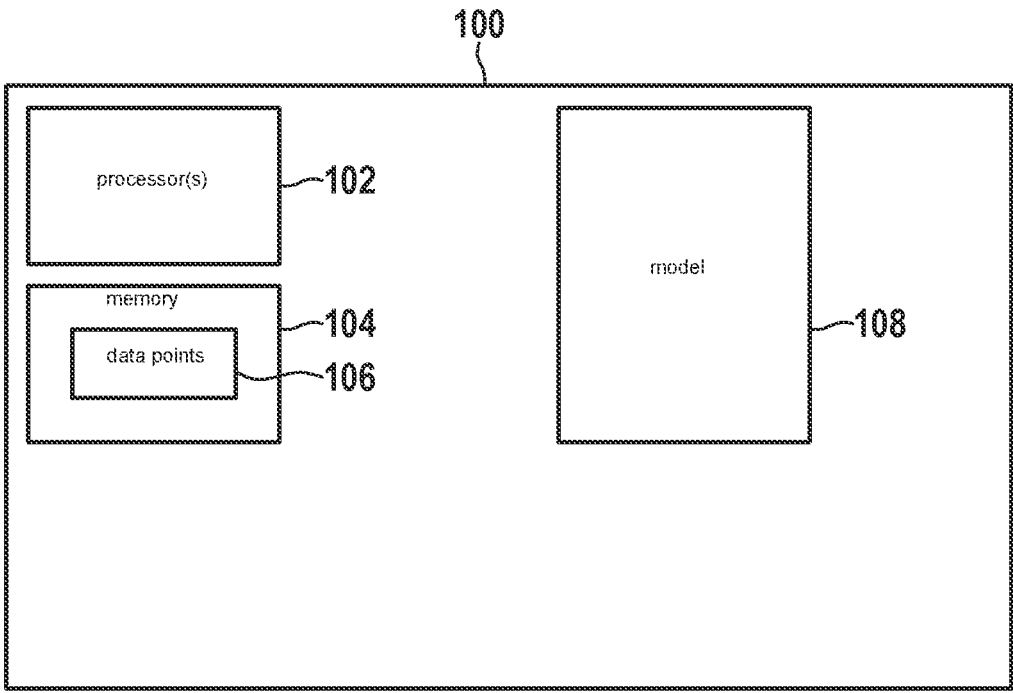
FIG. 1 schematically depicts an apparatus for filling a knowledge graph, in accordance with an example embodiment of the present invention.

FIG. 1 schematically depicts portions of an apparatus 100 for filling a knowledge graph. Apparatus 100 encompasses at least one processor 102 and at least one memory 104, and is embodied to execute the method described below.

A set of data points 106 is stored in the at least one memory 104. In the example, a data point from the set is defined by an embedding of a word, of a sentence, of a partial sentence, or of one or more word sequences, and by a label. The embedding of the sentence can be determined from embeddings of words of the sentence. The other embeddings can be determined correspondingly from embeddings of words. Preferably, a vector for the embedding of the sentence is determined. Preferably, the vector is normalized to one. Vectors that are likewise normalized to one can be determined for the embeddings of the words of the sentence.

A word2vec embedding can be used for the words. This is implemented, for example, as described in Tomas Mikolov, Kai Chen, Greg Corrado, Jeffrey Dean, "Efficient Estimation of Word Representations in Vector Space," ICLR Workshop 2013.

In the example, a set of labels is predefined. One of those labels is associated with the data point.

In the example, a text corpus that contains the sentence is provided. In the example, the procedure for other sentences of the text corpus is as described for the data point. The set of data points 106 encompasses a plurality of data points for a plurality of sentences from the text corpus. Different text corpora can also be provided. The text corpus can derive from a domain. The different text corpora can derive from the same domains or different domains.

Apparatus 100 encompasses a model 108 for classification. Model 108 is embodied to associate an embedding of a sentence, for example from a data point from among the set of data points, with a label. In the example, the label defines a relationship for the sentence in a knowledge graph. Apparatus 100 is embodied to select, from among a plurality of models, that model 108 with which the knowledge graph is filled.

Figure 2:
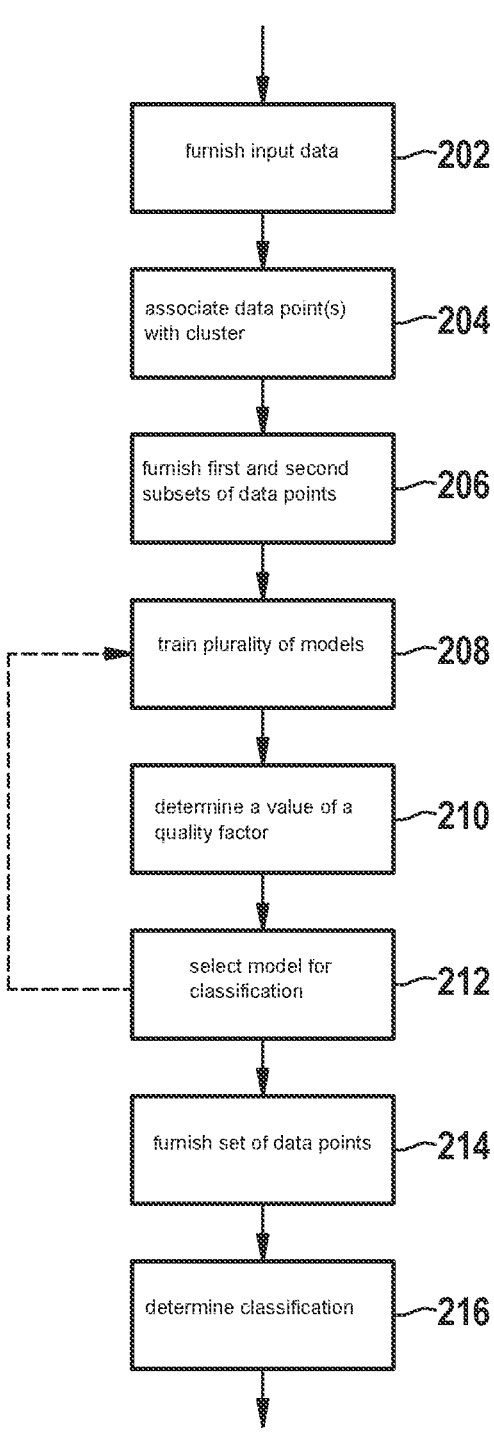
FIG. 2 shows steps in a method for filling the knowledge graph, in accordance with an example embodiment of the present invention.

FIG. 2 shows steps in a method for filling the knowledge graph.

The method provides a step 202 in which input data are furnished. The input data encompass the set of data points.

In a step 204, at least one data point to which a label is assigned is associated with a cluster from among a set of clusters. The data point is associated either with a first cluster or with a second cluster, depending on whether or not a distribution of labels from data points that are already associated with the cluster satisfies a condition. This aspect will be described in more detail below with reference to FIG. 3.

In the example, a number K of clusters is generated for the data points of the set of data points, which clusters can encompass data points having the same labels and/or ones different from one another. Provision can be made to associate each data point with exactly one cluster.

In a step 206, depending on the K clusters a first subset of the set of data points having training data points, and a second subset of the set of data points having development data points, are furnished. In the example, a set of training data points which encompasses data points from K−1 of the clusters is furnished. In the example, a set of development data points is furnished which encompasses data points from one of the clusters. This aspect will be described in further detail below with reference to FIG. 3.

Preferably, the second subset is not contained in the set of training data points. Preferably, the set of development data points does not encompass the first subset or any of the data points from one of the K−1 clusters.

Provision can be made to provide a subdivision differing from an association of K−1 clusters with the first subset and of one cluster with the second subset.

In a step 208, a plurality of models for classification are trained in a plurality of epochs, depending on data points from the first subset.

At least one model from among the plurality of models can be an artificial neural network that is defined by its hyperparameters. Different models from among the plurality of models can be artificial neural networks having different hyperparameters. In training, the weights of the respective artificial neural network are adapted. Preferably, training occurs in several epochs with the training data points from among the set of training data points. In one aspect, the hyperparameters of the artificial neural network remain unmodified in the training process.

In a step 210, a value of a quality factor is determined, depending on data points from the second subset, for at least one of the models from among the plurality of models. The value can be an indication of a conformity of the label from the classification of the embeddings from the data points of the second subset by the at least one model with the labels from those data points. In the example, the value is determined for the plurality of models.

In a step 212, a model for classification is selected, depending on the value, from among the plurality of models. In the example, the model selected is the one that best executes the classification of the development data points in accordance with the value.

Steps 208 to 212 can be repeated. Provision can be made to determine an average of the values of the models from the repetitions, and to select the model depending on the average.

In a step 214, a set of data is furnished. In the example, the data encompass an embedding of a sentence from a text corpus. The embedding can be determined in the manner described for the data point from among the set of data points. In the example, the data do not encompass a label. In the example, the data are determined from a text corpus other than the text corpus or corpora that were used for determining the set of data points.

In a step 216, a classification that defines a relationship in the knowledge graph for the sentence is determined using the model, selected depending on the value, for classification for data from among the set of data.

FIG. 3 shows details of step 204 of the method.

In a step 302, a plurality of cluster centers are furnished.

One of the cluster centers is associated with a cluster from among a set of clusters. In the example, one cluster from among the set of clusters is associated with each of the cluster centers. In step 302, a number of clusters for the data points is predefined. In the example, the number of clusters defines the number of cluster centers. For example, K cluster centers for K clusters can be predefined. Different sizes of clusters can be provided. For example, N data points can be provided for the second subset, (K−1)*N data points being provided for the first subset. The set of training data points thus encompasses (K−1)*N of the data points, and the set of development data points encompasses N of the data points. Provision is made, for example, that the N data points from one cluster are to constitute the second subset. In this example, the other (K−1)*N data points, which are associated with others of the K clusters, are to constitute the first subset.

The cluster centers are initialized or determined, for example, as described for the k-means++ algorithm in: David Arthur and Sergei Vassilivitskii, "k-means++: The Advantages of Careful Seeding," http://ilpubs.stanford.edu:8090/778/1/2006-13.pdf.

In a step 304, a series of data points with which the label is associated is determined.

In the example, the series is determined depending on a difference between a distance of a data point from a first cluster center of a first cluster from among the set of clusters, and a distance of the data point from a second cluster center of a second cluster from among the set of clusters.

In the example, the first cluster center is that cluster center from among the set of cluster centers which is located closest to the data point. In the example, the second cluster center is that cluster center from among the set of cluster centers which is located farthest from the data point.

For example, the data point is placed before another data point in the series if the difference is greater than a reference. Otherwise the datapoint is placed after the other data point in the series. A data point having the greatest difference with respect to the other data points is therefore placed as the first data point in the series. The others are then placed so as to be sorted in order of decreasing difference.

In the example, a series is determined for a plurality of labels.

A respective number of data points that are already associated with the respective cluster, and with which the respective label is associated, is then determined For the plurality of clusters for the plurality of labels.

In a step 306, the data points are associated with the clusters.

In the example, the data point is associated with the cluster if the number of data points that are associated with the cluster for the label satisfies a condition. The condition can define a predefined maximum number of data points that can be associated with the cluster. This means that an association is determined depending on whether or not a distribution of labels from data points that are already associated with the cluster satisfies a condition.

In the aspect in which the series is determined, the data points are associated in series with the cluster until the number of data points satisfies the condition.

In the example, data points from among the set of data points are associated with one of the cluster centers from among the plurality of cluster centers in the manner described for the data point.

In an optional step 308, pairs of data points from different clusters, which points are suitable for the purpose and whose labels match, can be exchanged. This will be described below for one pair. A corresponding test can be performed for a plurality of data points.

In a step 308-A, a third cluster center is determined depending on data points that are associated with the first cluster. The third cluster center is a new cluster center for the first cluster.

In a step 308-B, a fourth cluster center is determined depending on data points that are associated with the second cluster. The fourth cluster center is a new cluster center for the second cluster.

In a step 308-C, a first distance of a first data point of the first cluster from the third cluster center, and a second distance of the first data point from the fourth cluster center, are determined.

In a step 308-D, a third distance of a second data point of the second cluster from the fourth cluster center, and a fourth distance of the second data point from the third cluster center, are determined.

In a step 308-E, a first difference between the first distance and the second distance is determined.

In a step 308-F, a second difference between the third distance and the fourth distance is determined.

A step 308-G checks whether the first difference satisfies a first condition and the second difference satisfies a second condition.

In the example, in a step 308-H, if both conditions are satisfied, the first data point is associated with the second cluster and the second data point with the first cluster. These data points are thus exchanged with one another. Otherwise the data points are not exchanged with one another.

Steps 308-A to 308-H can be performed in this or another sequence for various data points. Preferably, the steps are repeated until no further pairs suitable for exchange are discovered.

In a subsequent step 310, data points that are associated with the cluster are associated either with the first subset or with the second subset.

In the example, the data points associated with the first cluster are associated with the first subset. In the example, the data points associated with the second cluster are associated with the second subset.

Provision can be made that data points from a plurality of clusters are associated with the first subset or with the second subset, depending on which cluster they are associated with.

What is claimed is:

1. A method for filling a knowledge graph, comprising the following steps:

determining a first subset of a set of data points and a second subset of the set of data points;

associating a data point to which a label is assigned with a cluster from among a set of clusters, the data point being associated with the cluster in response to a distribution of labels from data points that are already associated with the cluster satisfies a condition;

associating data points that are associated with the cluster either with the first subset or with the second subset;

training a plurality of models for classification depending on data points from the first subset;

determining, for at least one of the trained models from among the plurality of trained models, a value of a quality factor depending on data points from the second subset;

selecting a trained model for classification from the plurality of trained models depending on the value; and determining a classification that defines a relationship or a node or a type of node in the knowledge graph for a sentence using the trained model, selected depending on the value, for classification for data.

2. The method as recited in claim 1, wherein a number of data points, which are associated with the cluster and with which the label is associated, is determined, the data point being associated with the cluster if the number satisfies a condition, and otherwise not being associated.

3. The method as recited in claim 2, wherein a series of data points with which the label is associated is determined, the data points being associated with the cluster in accordance with the series as long as the number of data points satisfies the condition.

4. The method as recited in claim 3, wherein the series encompasses the data point, the series being determined depending on a difference between a distance of the data point from a first cluster center of a first cluster from among the set of clusters, and a distance of the data point from a second cluster center of a second cluster from among the set of clusters.

5. The method as recited in claim 4, wherein the data point is placed in the series either before another data point if the difference is greater than a reference, or otherwise after the other data point in the series.

6. The method as recited in claim 4, wherein the first cluster center is that cluster center, from among the set of cluster centers, which is located closest to the data point, the second cluster center being that cluster center, from among the set of cluster centers, which is located farthest from the data point.

7. The method as recited in claim 6, further comprising:

determining a third cluster center depending on data points that are associated with the first cluster;

determining a fourth cluster center depending on data points that are associated with the second cluster;

determining a first distance of a first data point of the first cluster from the third cluster center, and a second distance of the first data point from the fourth cluster center;

determining a third distance of a second data point of the second cluster from the fourth cluster center, and a fourth distance of the second data point from the third cluster;

determining a first difference between the first distance and the second distance;

determining a second difference between the third distance and the fourth distance; and based on the labels of the first and second data points being the same, and based on the first difference satisfying a first condition and the second difference satisfying a second condition, associating the first data point with the second cluster, and the second data point with the first cluster.

8. The method as recited in claim 1, wherein a plurality of cluster centers is furnished, data points from among the set of data points being associated with one of the cluster centers from among the plurality of cluster centers.

9. The method as recited in claim 8, wherein a number of subsets for the data points is predefined, the number of subsets defining a number of cluster centers.

10. An apparatus configured to fill a knowledge graph, the apparatus configured to:

determine a first subset of a set of data points and a second subset of the set of data points;

associate a data point to which a label is assigned with a cluster from among a set of clusters, the data point being associated with the cluster in response to a distribution of labels from data points that are already associated with the cluster satisfies a condition;

associate data points that are associated with the cluster either with the first subset or with the second subset;

train a plurality of models for classification depending on data points from the first subset;

determine, for at least one of the trained models from among the plurality of trained models, a value of a quality factor depending on data points from the second subset;

select a trained model for classification from the plurality of trained models depending on the value; and determine a classification that defines a relationship or a node or a type of node in the knowledge graph for a sentence using the trained model, selected depending on the value, for classification for data.

11. A non-transitory computer-readable medium on which is stored a computer program including computer-readable instructions for filling a knowledge graph, the instructions, when executed by a computer, causing the computer to perform the following steps:

determining a first subset of a set of data points and a second subset of the set of data points;

associating a data point to which a label is assigned with a cluster from among a set of clusters, the data point being associated with the cluster in response to a distribution of labels from data points that are already associated with the cluster satisfies a condition;

associating data points that are associated with the cluster either with the first subset or with the second subset;

training a plurality of models for classification depending on data points from the first subset;

determining, for at least one of the trained models from among the plurality of trained models, a value of a quality factor depending on data points from the second subset;

selecting a trained model for classification from the plurality of trained models depending on the value; and determining a classification that defines a relationship or a node or a type of node in the knowledge graph for a sentence using the trained model, selected depending on the value, for classification for data.

* * * * *